(12) United States Patent
Garg et al.

(10) Patent No.: US 11,109,077 B2
(45) Date of Patent: *Aug. 31, 2021

(54) CONTROLLING DELIVERY OF REQUESTED CONTENT BASED ON DELIVERY BANDWIDTH LIMITATIONS

(71) Applicant: Comcast Cable Communications, LLC, Philadelphia, PA (US)

(72) Inventors: Amit Garg, Delran, NJ (US); Tom Brown, West Chester, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,853

(22) Filed: Nov. 18, 2019

(65) Prior Publication Data
US 2020/0336775 A1 Oct. 22, 2020

Related U.S. Application Data

(63) Continuation of application No. 13/618,199, filed on Sep. 14, 2012, now Pat. No. 10,516,904.

(51) Int. Cl.
| | |
|---|---|
| *H04L 29/06* | (2006.01) |
| *H04N 21/2343* | (2011.01) |
| *H04N 21/24* | (2011.01) |
| *H04N 21/472* | (2011.01) |
| *H04N 21/2385* | (2011.01) |
| *H04N 21/63* | (2011.01) |
| *H04N 21/438* | (2011.01) |

(Continued)

(52) U.S. Cl.
CPC ... *H04N 21/23439* (2013.01); *H04N 21/2402* (2013.01); *H04N 21/47202* (2013.01); *H04L 47/25* (2013.01); *H04L 65/4084* (2013.01); *H04L 65/80* (2013.01); *H04N 21/2385* (2013.01); *H04N 21/26216* (2013.01); *H04N 21/4383* (2013.01); *H04N 21/631* (2013.01)

(58) Field of Classification Search
CPC ..... H04L 47/25; H04L 65/4084; H04L 65/80; H04N 21/2402; H04N 21/23439; H04N 21/4383; H04N 21/47202; H04N 21/2385; H04N 21/631; H04N 21/26246
See application file for complete search history.

(56) References Cited

U.S. PATENT DOCUMENTS

| | | |
|---|---|---|
| 6,324,184 B1 | 11/2001 | Hou et al. |
| 7,023,839 B1 | 4/2006 | Shaffer et al. |

(Continued)

OTHER PUBLICATIONS

U.S. Appl. No. 16/866,067, Optimized Delivery Techniques, filed May 4, 2020.

*Primary Examiner* — Jungwon Chang
(74) *Attorney, Agent, or Firm* — Banner & Witcoff, Ltd.

(57) ABSTRACT

A device, computer readable medium, system and method for overcoming bandwidth limitations is disclosed for determining that a bandwidth limitation is related to preventing delivery of content, identifying a version of the content capable of being transmitted over a lower bandwidth, querying a device requesting delivery of the content for an indication of acceptability of a lower bandwidth version of the content instead of a higher bandwidth version, and based on an affirmative response to the querying, causing delivery of the lower bandwidth version.

20 Claims, 7 Drawing Sheets

(51) Int. Cl.
*H04N 21/262* (2011.01)
*H04L 12/825* (2013.01)

(56) References Cited

U.S. PATENT DOCUMENTS

| | | | |
|---|---|---|---|
| 7,697,070 B1 | 4/2010 | Dugan et al. | |
| 7,770,200 B2 | 8/2010 | Brooks et al. | |
| 9,167,310 B2 | 10/2015 | Brown et al. | |
| 9,641,900 B2 | 5/2017 | Rahman | |
| 9,888,295 B2 | 2/2018 | Brown et al. | |
| 10,264,326 B2 | 4/2019 | Brown et al. | |
| 10,516,904 B2 * | 12/2019 | Garg | H04N 21/2402 |
| 10,694,261 B2 | 6/2020 | Brown et al. | |
| 2002/0072885 A1 | 6/2002 | Tang | |
| 2005/0289618 A1 | 12/2005 | Hardin | |
| 2006/0171390 A1 | 8/2006 | La Joie | |
| 2007/0099560 A1 | 5/2007 | Bowen et al. | |
| 2007/0101370 A1 | 5/2007 | Calderwood | |
| 2007/0116048 A1 | 5/2007 | Addington | |
| 2007/0133603 A1 | 6/2007 | Weaver et al. | |
| 2007/0157234 A1 | 7/2007 | Walker | |
| 2009/0028182 A1 | 1/2009 | Brooks et al. | |
| 2009/0060028 A1 | 3/2009 | Liu et al. | |
| 2009/0116379 A1 * | 5/2009 | Rahman | H04N 21/26216 370/229 |
| 2009/0150958 A1 | 6/2009 | Jerding et al. | |
| 2009/0193485 A1 * | 7/2009 | Rieger | H04N 21/2385 725/114 |
| 2010/0005499 A1 * | 1/2010 | Covey | H04L 29/12292 725/109 |
| 2010/0023579 A1 | 1/2010 | Chapweske et al. | |
| 2010/0306810 A1 | 12/2010 | Brooks et al. | |
| 2011/0007218 A1 * | 1/2011 | Moran | H04N 21/2362 348/555 |
| 2011/0072475 A1 * | 3/2011 | Mckiel, Jr. | H04N 21/2402 725/100 |
| 2011/0102683 A1 | 5/2011 | Josephs | |
| 2011/0126247 A1 | 5/2011 | Howarter et al. | |
| 2011/0197239 A1 * | 8/2011 | Schlack | H04N 21/2393 725/95 |
| 2012/0124629 A1 * | 5/2012 | Musick | H04N 21/6125 725/95 |
| 2012/0192234 A1 * | 7/2012 | Britt | H04N 21/2402 725/58 |
| 2012/0284736 A1 * | 11/2012 | Friedman | H04H 20/22 725/14 |
| 2013/0047182 A1 | 2/2013 | Gudlavenkatasiva et al. | |
| 2013/0128738 A1 | 5/2013 | Cohen et al. | |
| 2013/0179588 A1 | 7/2013 | McCarthy et al. | |
| 2013/0219423 A1 | 8/2013 | Prickett et al. | |
| 2013/0239154 A1 | 9/2013 | Bagasra | |
| 2013/0308470 A1 | 11/2013 | Bevan et al. | |
| 2014/0082212 A1 | 3/2014 | Garg et al. | |
| 2014/0082681 A1 | 3/2014 | Brown | |

\* cited by examiner

CONTROLLING DELIVERY OF REQUESTED CONTENT BASED ON DELIVERY BANDWIDTH LIMITATIONS

RELATED APPLICATIONS

The present application claims priority to, and is a continuation of, U.S. patent application Ser. No. 13/618,199, filed Sep. 14, 2012, entitled "Controlling Delivery Of Requested Content Based On Delivery Bandwidth Limitations", which is hereby incorporated by reference in its entirety for all purposes.

BACKGROUND

Many systems permit a viewer to download video content at a desired time. One example is video on demand (VOD), where video content may be stored as a file on a video server remote from a user's device. Content service providers may offer VoD real time streaming, such as pay-per-view, permitting a user to buy or select video content in the form of a movie or television program. A user device may request particular video content and the remote server may stream the requested content over a network to the user device for viewing now or for storing and viewing at a later time.

Issues may occur when distributing video content from the video server to the user device via a network, particularly for content requiring high bandwidth and/or during periods of high demand. One such issue may occur when a user requests, for example, high definition (HD) content. During periods of high demand, a request for HD content may be received by the video server at a time when there is insufficient bandwidth available over the network to stream the HD content from the remote server to the user device. Another problem may occur during periods of high demand if a request for HD content is received by the video server at a time when the content is not locally stored by the video server (e.g., in a cache or other local memory), and there is insufficient bandwidth available, on a back link, for example, for the video server to obtain the requested HD content from another source for ultimate delivery to the user device.

Current solutions are to deny the request for content, or to deliver the content despite the insufficient bandwidth. Denying the request erodes customer confidence in the service, which is undesirable, particularly when the request is denied without explanation. Attempting to deliver content from the video server despite insufficient bandwidth risks an unsatisfactory viewing experience due to compromised, inconsistent or unpredictable video quality. Further, forced delivery despite insufficient bandwidth may cause an unsatisfactory viewing experience to other users served by the system.

Thus, there exists a need for a solution to allow for delivery of data or content in view of bandwidth limitations from a provider to the consumer.

BRIEF SUMMARY OF THE DISCLOSURE

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address at least the issues mentioned above by disclosing systems, methods, computer readable media, and apparatuses for delivering data, such as video content or other content data, that may be modified, transcoded, revised, reformatted, compressed, or the like, from requested video content in order to alleviate bandwidth limitations. The apparatus, system and method may include, for example, substituting substantially similar content of a smaller file size, and/or modified content type, for the requested content.

Aspects of the disclosure may be provided in a memory, such as a non-transitory computer-readable medium, having computer-executable instructions that, when executed, cause a computer, user terminal, or other apparatus to at least perform one or more of the processes described herein.

In some aspects, an example method of overcoming a bandwidth limitation in a content distribution network may include determining the bandwidth limitation is related to preventing delivery of content, identifying a version of the content capable of being transmitted over a lower bandwidth, wherein the lower bandwidth version is a substantive equivalent of a higher bandwidth version, and determining if there is sufficient available bandwidth to deliver the lower bandwidth version. The method may also comprise querying a requestor of the content for an indication of acceptability of substitution, or replacement, of the high bandwidth version with the lower bandwidth version. The lower bandwidth, or replacement, content may be delivered in response to an affirmative response to the query. The query may include a prompt to a user from the network for a response.

Determining the bandwidth limitation may include continuously monitoring bandwidth on all or some portions of a network. The replacement content may be a standard definition (SD) version of high definition requested content, or a lower resolution version of high definition content suitable for a smaller display device, for example.

In some aspects, an apparatus, computer readable medium, system apparatus, and method in accordance with the disclosure may include a bandwidth monitor for identifying a bandwidth limitation for delivery of a higher bandwidth version of content and for determining that there is sufficient bandwidth to deliver a lower bandwidth version of the content. The disclosure also provides a content guide for identifying the lower bandwidth version, a prompter for querying about an acceptability of delivery of the lower bandwidth version of the content instead of the higher bandwidth version, and a server for the delivery of the lower bandwidth version to a device or user that requested the content.

Thus, in some examples, the disclosure may allow for delivery of data, such as video content and/or other content data, in view of bandwidth limitations.

BRIEF DESCRIPTION OF THE FIGURES

Understanding of the disclosure will be facilitated by consideration of the following detailed description taken in conjunction with the accompanying drawings, in which like numerals refer to like parts.

DETAILED DESCRIPTION OF EXAMPLE EMBODIMENTS

It is to be understood that the figures and descriptions of the disclosure have been simplified to illustrate elements that are relevant for a clear understanding, while eliminating, for the purpose of brevity, many other elements found in typical content delivery systems and methods. Those of ordinary skill in the art will thus recognize that other elements and/or steps are desirable and/or may be included. However, because such elements and steps are well known in the art, a discussion of such elements and steps may not be provided herein. The disclosure herein is also directed to variations and modifications to such elements and methods known to those skilled in the art.

When a user requests particular content from a content delivery network, that content may be obtained from a remote server and streamed, such as via one or more real time streaming servers, over the content delivery network to a user device. According to examples of the disclosure, if issues occur within the content delivery network that prevent delivery of the particular content, the remote server may send a communication, such as a message, to the user device or other device associated with the requesting user, such as a gateway, set-top-box (STB), display device, etc., indicating that the requested content, or the requested version of the content, is not currently available. The message may suggest delivery of a different version of the content, e.g., a different file type, having a smaller data size requiring less bandwidth for delivery, delivering a compressed version, etc. If the lower bandwidth consuming file type is selected, the requested content may then be delivered to the user device. The delivered content, and/or the user device to which the content is delivered, may be chosen by the user. If the lower bandwidth consuming file type is not selected, the user device may present a content listing to prompt the user for an alternative selection.

Figure 1:
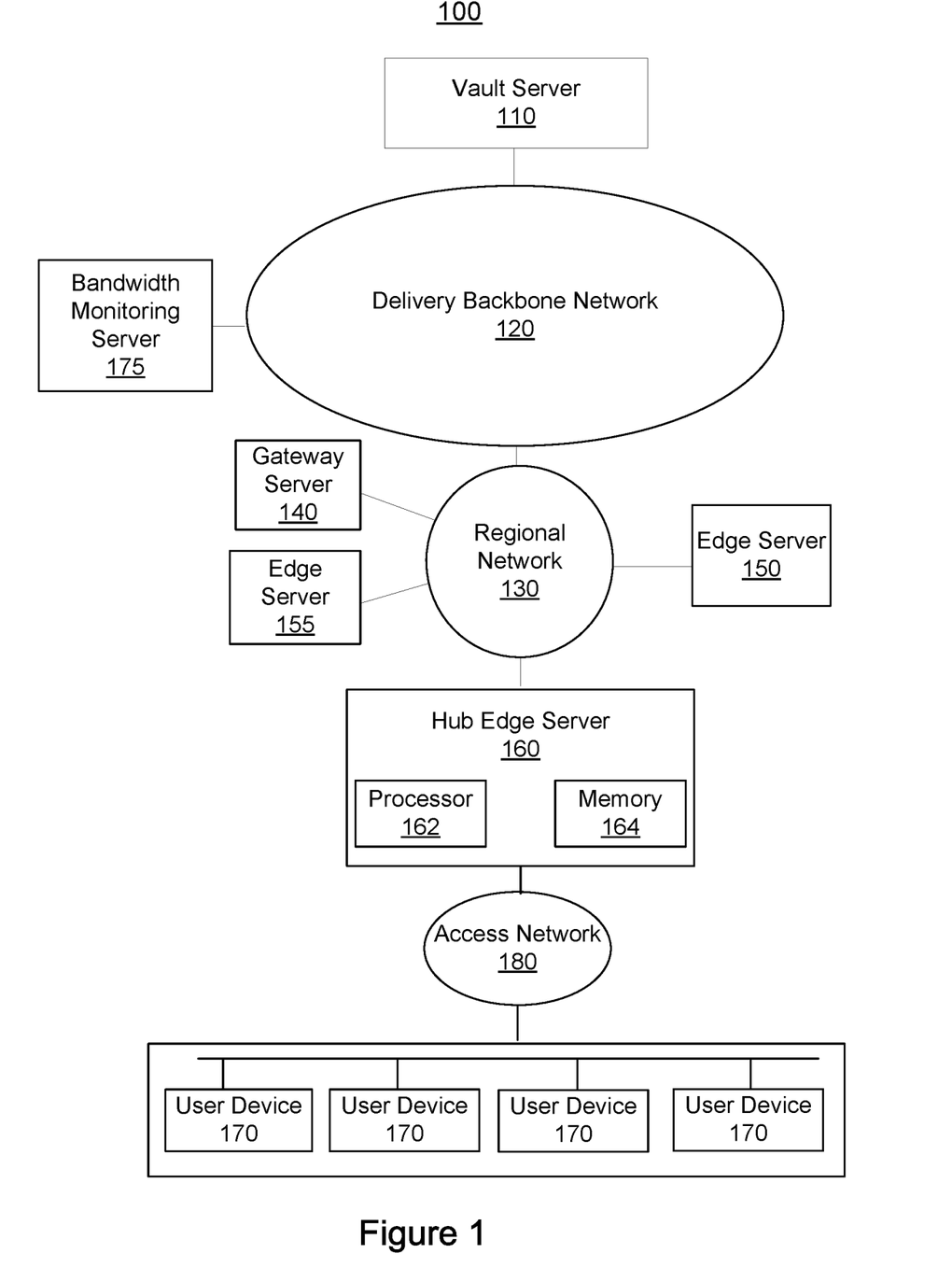
FIG. 1 depicts an example architecture for a content delivery system in accordance with an aspect of the disclosure.

Referring now to FIG. 1, there is shown an example architecture of a content delivery system 100 in accordance with an aspect of the disclosure. As illustrated, content delivery system 100 may include a vault server 110, a delivery backbone network 120, regional network(s), such as one or more converged regional area network(s) 130, gateway server 140, edge servers 150, 155, hub edge server 160, one or more user devices 170, at least one bandwidth monitoring server 175, and an access network 180. User devices 170 may be gateways, set top boxes, display devices, televisions such as Internet Protocol (IP) televisions (IPTV), satellite receivers, mobile video-capable devices, intelligent appliances, telephones, smart phones, mobile phones, and the like, by way of non-limiting example.

Additional instances of each component depicted in FIG. 1, as well as additional components not shown, may be included in the content delivery system 100. The functionality of the depicted components may be included in other devices, and the depicted components may be combined. Each of the components depicted in FIG. 1 may include at least one processor and at least one memory (or other computer readable medium). The at least one memory may store computer executable instructions that, when executed by the at least one processor, cause the corresponding component to perform its operations described herein. FIG. 1, for instance, depicts hub edge server 160 including a processor 162 and memory 164.

Vault server 110 may be communicatively coupled to network 130 via the backbone network 120, or by another communication link. The vault server 110 may store the majority of, or all of, the content available, although copies of content may be stored in other locations. Vault server 110 may contain data, such as a plurality of available titles of video content. Vault server 110 may additionally monitor the entire system, and may provide distribution information and monitor statistics associated with each user device, subsets of devices, and/or all devices. The vault server may take the form of a single server with a large volume of computerized storage, or may be a multitude of servers that work in unison to maintain the content.

Delivery backbone network 120 may include distribution components and may include gateways, routers, servers and switches as would be understood to those possessing an ordinary skill in the pertinent arts, for example. Delivery backbone network 120 may distribute data and may have an allocated bandwidth associated therewith for carrying the distributed data. The allocated bandwidth may be monitored by a bandwidth monitoring server 175. The bandwidth monitoring server 175 is illustratively shown as being communicatively coupled to the delivery backbone network 120. The bandwidth monitoring server 175 may be additionally or alternatively included at any point in the video content delivery system 100. The disclosure herein contemplates that a single or multiple bandwidth monitoring servers 175 may be utilized to monitor some or all bandwidth consumption within the content delivery system 100, and/or to monitor specific bandwidth consumption within the system.

Network 130 may take the form of any network capable of carrying voice, video and/or data. Network 130 may be a regional network and may transport voice, video, and data, such as Internet Protocol (IP) data. Network 130 may also provide redundancy for other networks.

Interconnected with network 130 may be one or more gateway servers 140, one or more edge servers 150, 155 and one or more hub edge servers 160. Hub edge server 160 may be an edge server acting as a hub for servicing one or more user devices 170. Hub edge server 160, as used herein, may also be an edge server 150, 155. Interconnected with hub edge server 160 may be at least one user device 170.

Gateway server 140 may contain a subset of the data and/or content files stored at the vault server 110. Gateway server 140 may contain files that have been recently viewed and/or used, and that may be stored on one of the edge servers 150, 155, thereby minimizing back link requests to vault server 110. Gateway server 140 may use a prediction algorithm to determine which files to store, which files to delete, and which files to add. For example, when determining whether to add a file newly available from vault server 110, gateway server 140 may parse metadata associated with the file for comparison with a metadata of stored files to predict an amount of viewer interest. Metadata may include keywords, names of actors, title of the content, etc. If gateway server 140 identifies a match between a certain amount of the metadata associated with the file and metadata of stored files, gateway server 140 may request the file from the vault server 110 and store locally in a cache.

The content delivery system 100 may include a tiered configuration, such as where vault server 110 is at a top tier, gateway server 140 serving a region and/or network 130 are at the next tier, and edge servers 150, 155 are at yet another tier, for example. Such a tiered configuration may have associated therewith a limited or various levels of bandwidth available for the delivery of data and/or content. Also, gateway server 140 may be resident at various locations within the system 100 to provide, among other things, bandwidth assistance to edge servers 150, 155.

Edge servers 150, 155 may service only a respective group of devices 170 found within a service area or network 130 of the respective edge server. Edge server 150, 155 may contain a subset of the data files stored in the vault server 110 or gateway server 140. If edge server 150 receives a request for data, edge server 150, instead of vault server 110, may stream that data to device 170 via an access network 180. For example, the data may be moving picture experts group (MPEG) packets, such as MPEG-2 or MPEG-4. The MPEG packets may also be compressed. The access network 180 may be configured to transport data from between the user device 170 and the edge server 150. The titles stored at the edge server 150 may overlap with the titles residing on gateway server 140.

Edge servers 150, 155 may allow for connection to a gateway server 140, rather than connecting to vault server 110, by a requesting user device 170. Edge servers 150, 155 may service requests from a large number of user devices 170, and may, for example, only send those requests to vault server 110 when the edge servers 150, 155 do not have the requested content stored locally. Edge servers 150, 155 may thus filter or screen the load of connection requests, such as to conserve bandwidth and system resources for high-volume streaming or other type of content delivery. Edge servers 150, 155 may manage connections, cache content, and push data to the user devices 170. At edge servers 150, 155, the cached content may be cached in a memory and/or on a local storage device(s), for example.

Edge servers 150, 155 may be deployed individually or in clusters. Edge servers 150, 155 may also be chained, where one edge server collects and services the connection requests from other edge servers and their respective client or user devices. For example, one edge server might service and forward requests from clients in Philadelphia, and another might service and forward requests from Washington, D.C. The edge servers in Philadelphia and Washington, D.C. may gather the requests from their respective client devices and may forward the requests to vault server 110 located in another geographic location, such as New York. The requesting edge servers may receive the responses from vault server 110, and may then distribute the received responses back to the user devices 170 in Philadelphia or Washington, D.C., respectively. An edge server may store the response received from vault server 110 in a cache, and may make that response available to other devices that connect to that edge server, thereby reducing overall load on vault server 110.

In a further effort to distribute load, edge servers 150, 155 may be in multiple tiers, such as a host tier and a distribution tier. For example, a content transmission may originate in Philadelphia. The content may be pushed to a tier of edge servers in, for example, New York, Chicago, Los Angeles, and Washington, D.C. Each edge server might then be connected to a cluster of edge servers that would comprise the distribution tier.

Hub edge server 160 may provide or be a node for connection and/or communication with user devices 170, such as between edge servers 150, 155 and user devices 170, for example. This connection and/or communication may employ techniques such as quadrature amplitude modulation (QAM), or internet protocol delivery. Hub edge server 160 may also store data and/or content files.

User device 170 may be a device that connects to, includes, or has a display for displaying video and/or audio content. Example user devices may include a set top box (STB), a digital video recorder (DVR), a personal video recorder (PVR), a television, a computer (e.g., a laptop or desktop computer), a media player, a mobile phone, a smart phone, or other device configured to transmit and receive information. User device 170 may cause the display to render the received data/signal, or may itself display content. Device 170 may receive signals from edge servers 150, 155 and/or hub edge server 160, and/or vault server 110, for example.

Data and/or content may be stored at edge server 150, 155, gateway server 140, and vault server 110, as described hereinabove. Upon receiving a request for content (e.g., a particular video program) from a user device 170, the hub edge server 160 may check first at edge server 150, 155 whether the requested content is stored locally. If edge server 150, 155 has a copy of the requested content, the edge server 150, 155 may deliver the requested content to the requesting device 170. In some examples, the edge servers 150, 155, and 160 may not forward requests to one another and instead the hub edge server 160 may forward the request to the gateway server 140 to query if the gateway server 140 has a copy of the requested content. In the event that gateway server 140 has a copy of the requested content, the gateway server 140 may deliver the requested content to the requesting device 170. In the event that neither edge server 150, 155 nor gateway server 140 has a copy of the requested title, the hub edge server 160 may query the vault server 110 to request the content. In another example, the hub edge server 160 may not directly communicate with the vault server 110, and instead the hub edge server 160 may request that the gateway server 140 query the vault server 110 to request the content. Once located on vault server 110, the vault server 100 may deliver the requested content to the requesting user device 170.

In the event that a request for content is unable to be fulfilled as a result of a bandwidth limitation, such as a bandwidth limitation between hub edge server 160 and device 170, and/or between vault server 110 and hub edge server 160, or elsewhere between any two devices in the system 100, hub edge server 160 or another device in the system may deliver a query to the user of device 170 to inquire whether it would be acceptable to substitute a lower bandwidth version of the requested content.

To assist the user in making their decision, the query may present information on network conditions to the user. The network conditions may indicate an amount of bandwidth currently available to fulfill the user's request, predicted changes in available bandwidth over a duration of the content when started at a particular time, and a predicted time in the future when the user may be able to be able to obtain the higher bandwidth version of the content. For example, the bandwidth monitoring server 175 may track an average amount of available bandwidth over time for a network path causing a bandwidth limitation relating to preventing delivery of the higher bandwidth version. Based on the average, the bandwidth monitoring server 175 may estimate when sufficient available bandwidth may be available to provide the higher bandwidth version (e.g., in 34 minutes). In a more detailed example, bandwidth monitoring server 175 may monitor an average amount of available bandwidth via one or more network paths to user device 170 in 15 second increments. Bandwidth monitoring server 175 may make comparisons of average available bandwidth from day to day (e.g., Monday to Tuesday), from a day in one week to the same day in one or more preceding weeks (e.g., Monday of this week to Mondays in the previous 4 weeks), from a particular day in year to the same day in one or more preceding years (e.g., May 8, 2011 to May 8 in 4 preceding years). Based on the average available amount of bandwidth over time and an amount of bandwidth required to deliver the higher bandwidth version, bandwidth monitoring server 175 may predict at what time the average amount of available bandwidth on a particular network path would exceed the amount of bandwidth required to deliver the higher bandwidth version. If the user were to begin watching a lower bandwidth version of the content, bandwidth monitoring server 175 may use the average to predict at what time delivery of the lower bandwidth could be replaced with delivery of the higher bandwidth version.

Upon receiving an indication of a user's acceptance of the substitution, hub edge server 160 may request the lower bandwidth version from vault server 110, if the lower bandwidth version is not found locally at hub edge server 160, gateway server 140 or hub edge servers 150, 155. Once the lower bandwidth content is located and received, from vault server 110, for example, or if the lower bandwidth content is cached locally to hub edge server 160, hub edge server 160 may deliver the lower bandwidth content to user device 170.

Figure 2:
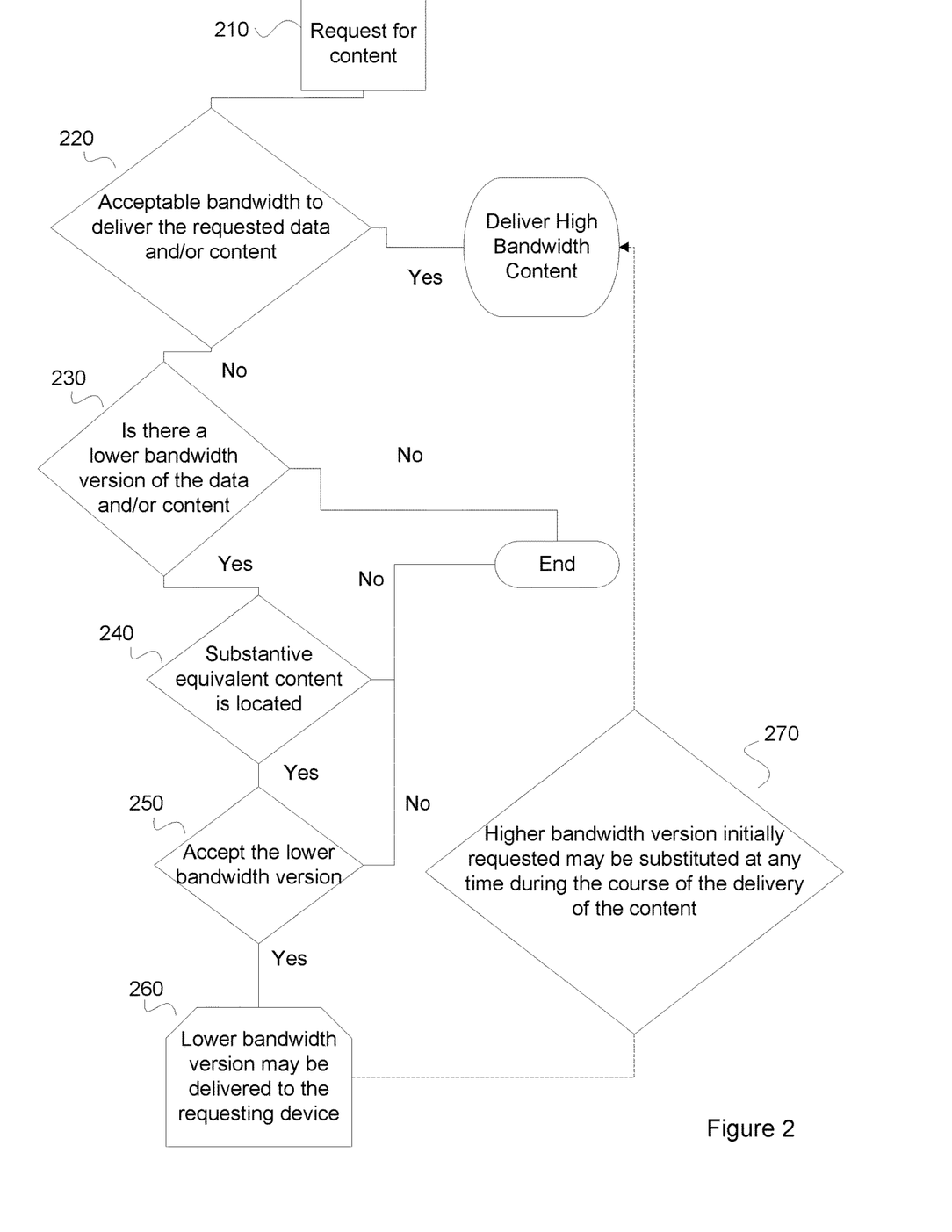
FIG. 2 illustrates an example delivery methodology for content in accordance with an aspect of the disclosure.

Referring now to FIG. 2, there is shown an example content delivery methodology in accordance with an aspect of the disclosure. The method may be performed by an edge server, a computer, or other device depicted in FIG. 1. The method may include additional blocks than those depicted in FIG. 2, the blocks may be arranged in other orders, the blocks may repeat one or more times, and the flow diagram may repeat one or more times.

As shown in FIG. 2, a request for content at step 210 may be made by user device 170. Request for data and/or content at step 210 may be made by a user, such as via any request-capable user device, to a content delivery network server. At step 220, a decision is made as to whether there is acceptable bandwidth to deliver the requested data and/or content. The decision may be made, for example, by bandwidth monitoring, such as by the bandwidth monitoring server 175 or the hub edge server 160, that compares available bandwidth to the bandwidth required for delivery of the content requested at step 210. For example, the hub edge server 160 may incorporate the bandwidth monitoring server 175 and may constantly monitor available bandwidth and may, upon receipt of a content request, determine the bandwidth, with or without overhead in addition to the content, that is required to deliver the requested content. The required bandwidth may be obtained by the hub edge server 160 from, for example, a central facility, one or more other network servers, or by accessing by the hub edge server 160 receiving the content request of a table that relationally indicates the typical bandwidth consumed to that requested content.

If there is sufficient delivery network bandwidth at step 220 to deliver the requested data and/or content, as determined, for example, by the hub edge server 160, then the requested data and/or content may be delivered. In response to determining that a bandwidth limitation is related to preventing delivery of the content, the hub edge server 160 may determine, at step 230, if there is a version of the data and/or content capable of being transmitted over a lower bandwidth, such as of an alternative content type that may be a substantive equivalent of the requested data and/or content (for example, a standard definition version in lieu of a high definition version). As used herein, a "substantive equivalent" may indicate that the substance of the data and/or content is substantially the same, although a type of the data is different. For example, video program data may be available in multiple video formats (e.g., high definition, standard definition, etc.). At step 240, the substantive equivalent content is located. Step 240 may include determining the location of such substantive equivalent content, such as determining whether the substantive equivalent content is cached at a particular network server, such as the edge server, or whether another network server, such as the vault server, needs to be queried at step 240.

Assessing the availability of a lower bandwidth version of the title may be performed using a content guide, for example. Such a content guide may contain a table of titles available, and may cross reference associated versions of the same or similar titles, including but not limited to high definition and standard definition versions of the same specific title, for example.

If the bandwidth is sufficient for a lower bandwidth version to be delivered, the hub edge server 160 may, at step 250, query the user device 170 to prompt the user whether delivery of the lower bandwidth version, instead of the higher bandwidth version, would be acceptable. This query may be performed using a prompter from the user device, for example, that delivers a prompt to the user and enables the user to provide feedback in response to the prompt. The user may be presented the content guide showing different versions of the available content. Based on the response, the hub edge server 160 may cause delivery of the lower bandwidth version to the requesting user device at step 260. While delivering the lower bandwidth version, the hub edge server 160 may periodically or continuously monitor bandwidth. If sufficient additional bandwidth becomes available to permit delivery of the higher bandwidth version, the hub edge server 160 may reserve at least a portion of the additional bandwidth. After the bandwidth is reserved, the hub edge server 160 may automatically substitute the higher bandwidth version at any time during the course of the delivery of the content at step 270. In another example, the hub edge server 160 may instruct the user device 170 to prompt the user whether the higher bandwidth version is still desired. The user device 170 may then respond to server 160 indicating whether the higher bandwidth version is still desired, and, if still desired, the hub edge server 160 may then provide the higher bandwidth version.

For example, a request for HD content may be received at hub edge server 160. A determination of whether there is sufficient bandwidth available to deliver the specific HD content to the requesting device may be performed. If there is not sufficient bandwidth, a check for the availability of the SD version of the requested content may be made at any one or more of network servers, such as at the edge server, a gateway server, or a vault server, for example. If the SD content version of the content is available, a message may be sent to the requesting device indicating that the HD version is currently unavailable, but that SD version is available for viewing, and the device may be queried to prompt the user regarding substitution of the SD version for the unavailable HD version.

Figure 3:
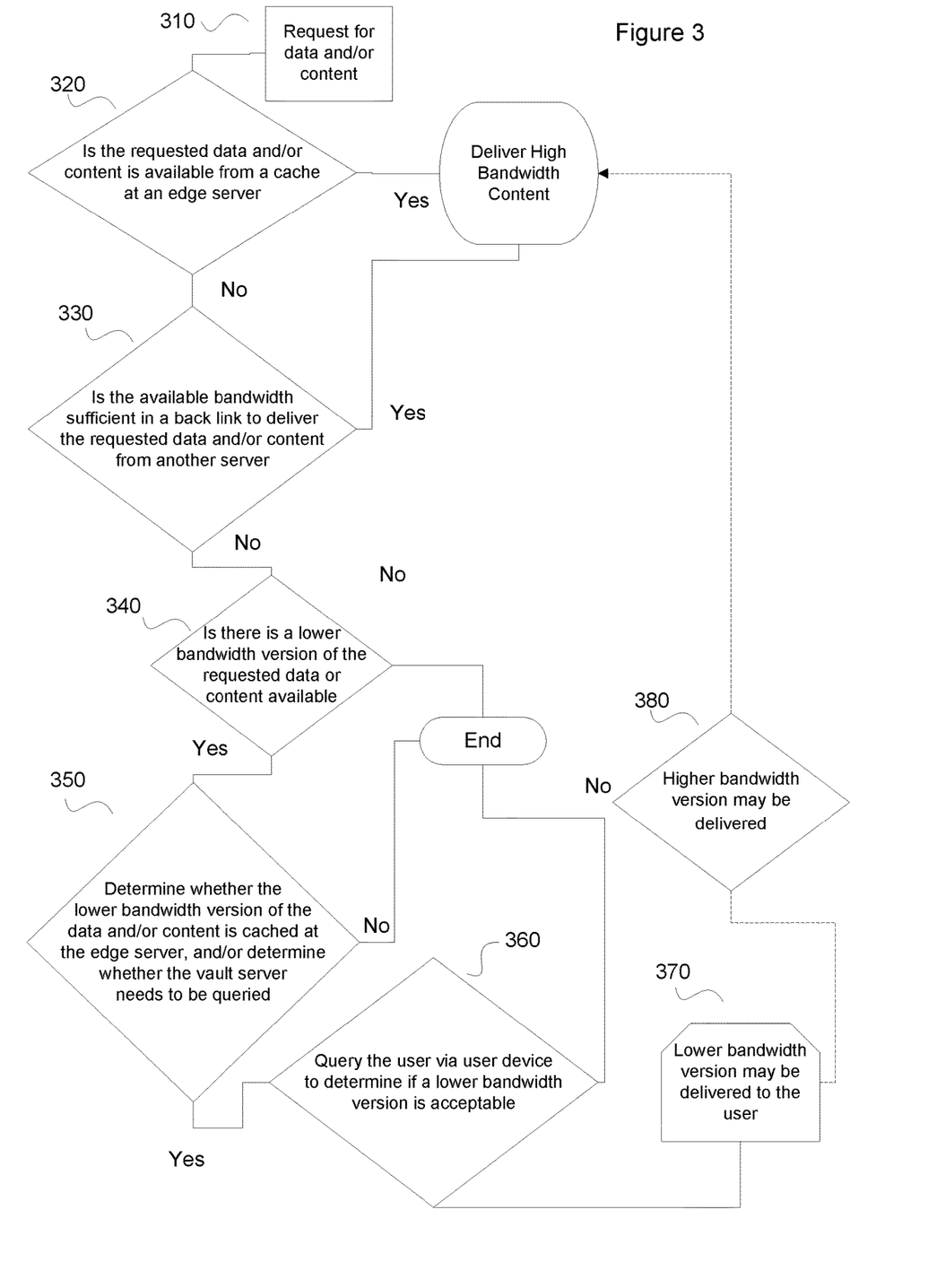
FIG. 3 illustrates an example delivery methodology for content in accordance with an aspect of the disclosure.

Referring now to FIG. 3, there is shown another example video content delivery methodology in accordance with an aspect of the disclosure. The method may be performed by an edge server, a computer, or other device depicted in FIG. 1. The method may include additional blocks than those depicted in FIG. 3, the blocks may be arranged in other orders, the blocks may repeat one or more times, and the flow diagram may repeat one or more times.

As shown in FIG. 3, a request for data and/or content may be made to a hub edge server at step 310, such as from a user device, for example. If the requested data and/or content is available from a cache at the hub edge server 160, as determined at step 320, and there is available bandwidth between the edge server and the user device, the hub edge server 160 may cause delivery of the requested data and/or content. If the requested data and/or content is not available in the cache, the hub edge server 160 may determine whether available bandwidth is sufficient in a back link to the vault server 110 to deliver the requested data and/or content from the vault server 110 at step 330. This determination may be performed using a bandwidth monitor, for example. If the back link has sufficient bandwidth for delivery, the requested data and/or content may be delivered from the vault server 110, and on to the requesting user device.

If the bandwidth in the back link cannot support delivery of the requested data and/or content, the hub edge server 160 may determine if there is a lower bandwidth version of the requested data or content available at step 340, such as if a standard definition version might be provided in lieu of a high definition version of the title, for example. The substitution of a lower bandwidth version of the requested data and/or content may be performed using a content guide, for example, as discussed hereinabove. Whether the lower bandwidth version of the data and/or content is cached at the edge server, and/or whether the vault server need be queried, may be determined at step 350.

If it is determined that bandwidth is sufficient for a lower bandwidth version to be delivered, the hub edge server 160 may query the user device prompting the user if a lower bandwidth version is acceptable at step 360. Based on the response, the hub edge server 160 may cause delivery of the lower bandwidth version to the user device at step 370. Of course, if bandwidth becomes available during delivery, the higher bandwidth version may be delivered at step 380 as discussed above with respect to FIG. 2.

Figure 4:
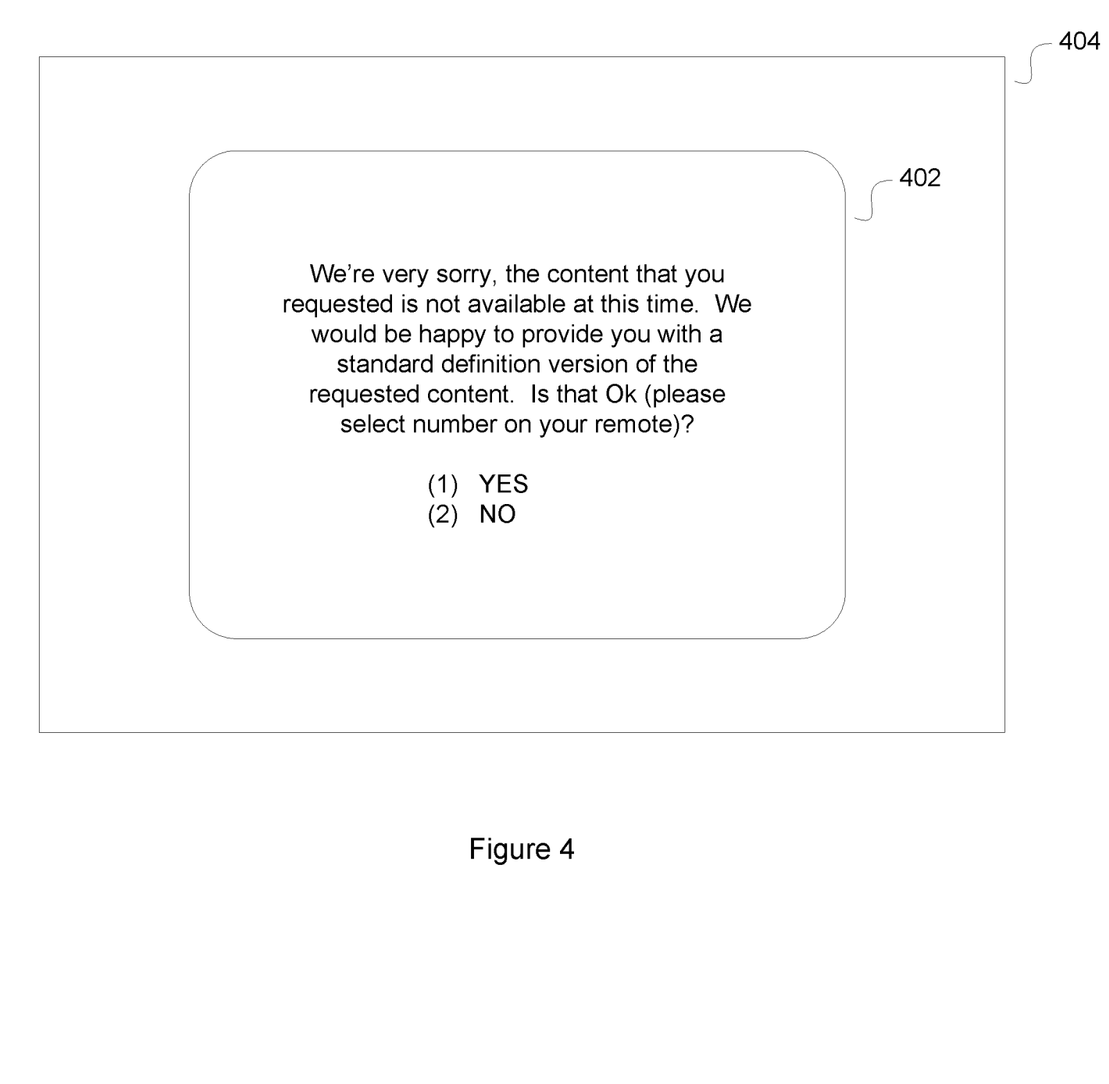
FIG. 4 illustrates an example user interface for prompting a user regarding alternative content delivery in accordance with an aspect of the disclosure.

FIG. 4 illustrates an exemplary user interface (UI) 402 presented by a display device 404 of the user device 170 for use in the methodologies of FIGS. 2 and 3 in accordance with an aspect of the disclosure. In the illustrated UI, the user has requested particular content, and, due to bandwidth constraints, the user's requested content is unavailable. Consequently, the user device may present the UI of FIG. 4, in which the user is queried as to the acceptability of producing, responsive to the user's request, alternative bandwidth content. In this example, the user has requested an HD program, and is asked whether delivery of the SD version of the requested HD program instead of the HD version would be acceptable.

Figure 5:
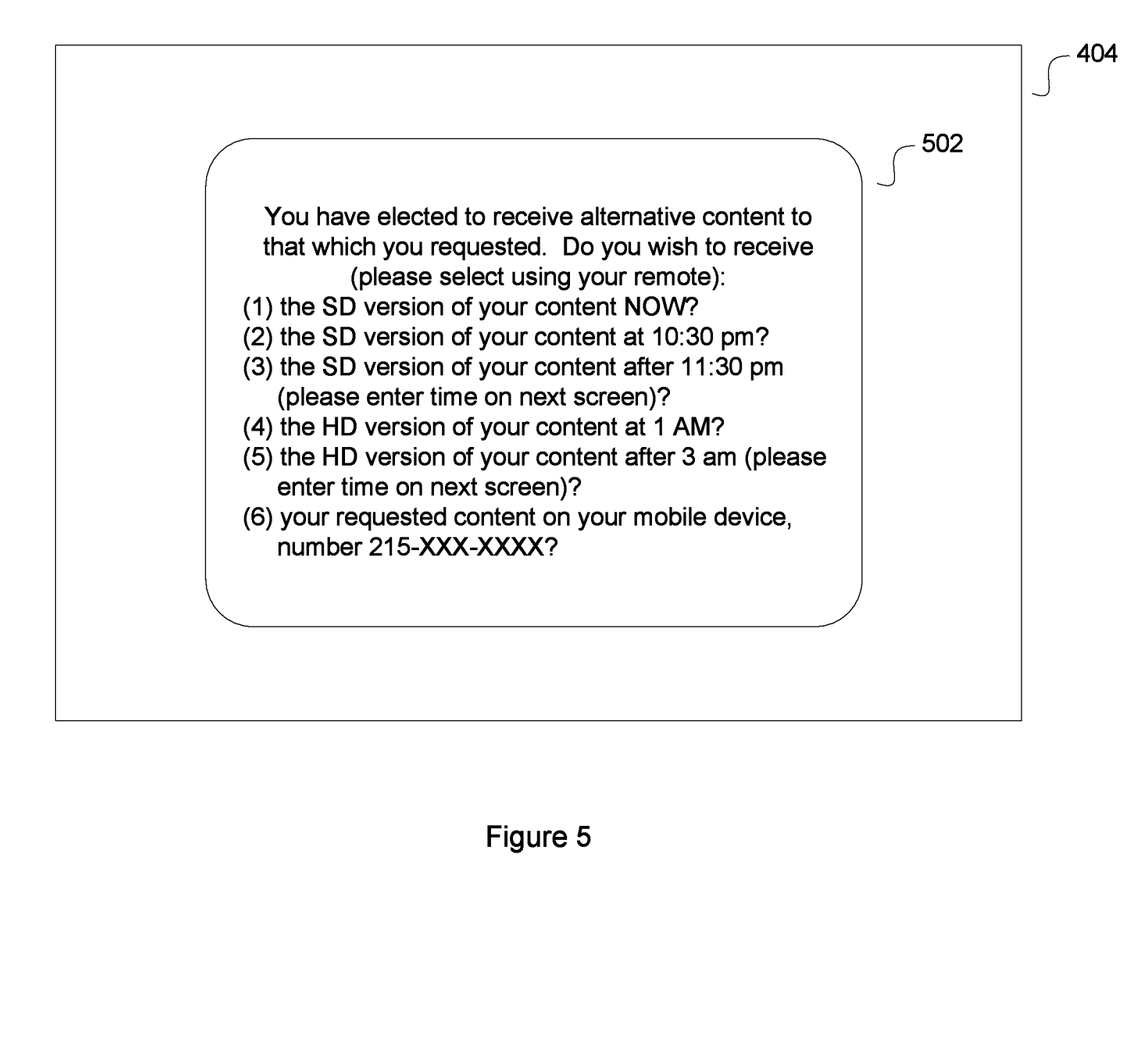
FIG. 5 illustrates an example user interface for prompting a user regarding alternative content delivery in accordance with an aspect of the disclosure.

Referring now to FIG. 5, an exemplary UI 502 presented by a display device 404 of the user device 170 is shown for use in the methodologies of FIGS. 2 and 3, in accordance with an aspect of the disclosure. In this UI, the user is provided with a menu of options to obtain the requested content, such as in the event the requested content is not available due to bandwidth constraints. In the example, the user has requested an HD program, and has been told that the requested program is not available. The user may be asked whether the user would like to receive the SD version of the requested content immediately, the SD version of the content at a later time indicated by the network or selectable by the user, the HD version of the content at a later time indicated by the network or selectable by the user, or the SD or HD version on a device other than the requesting user device.

Figure 6:
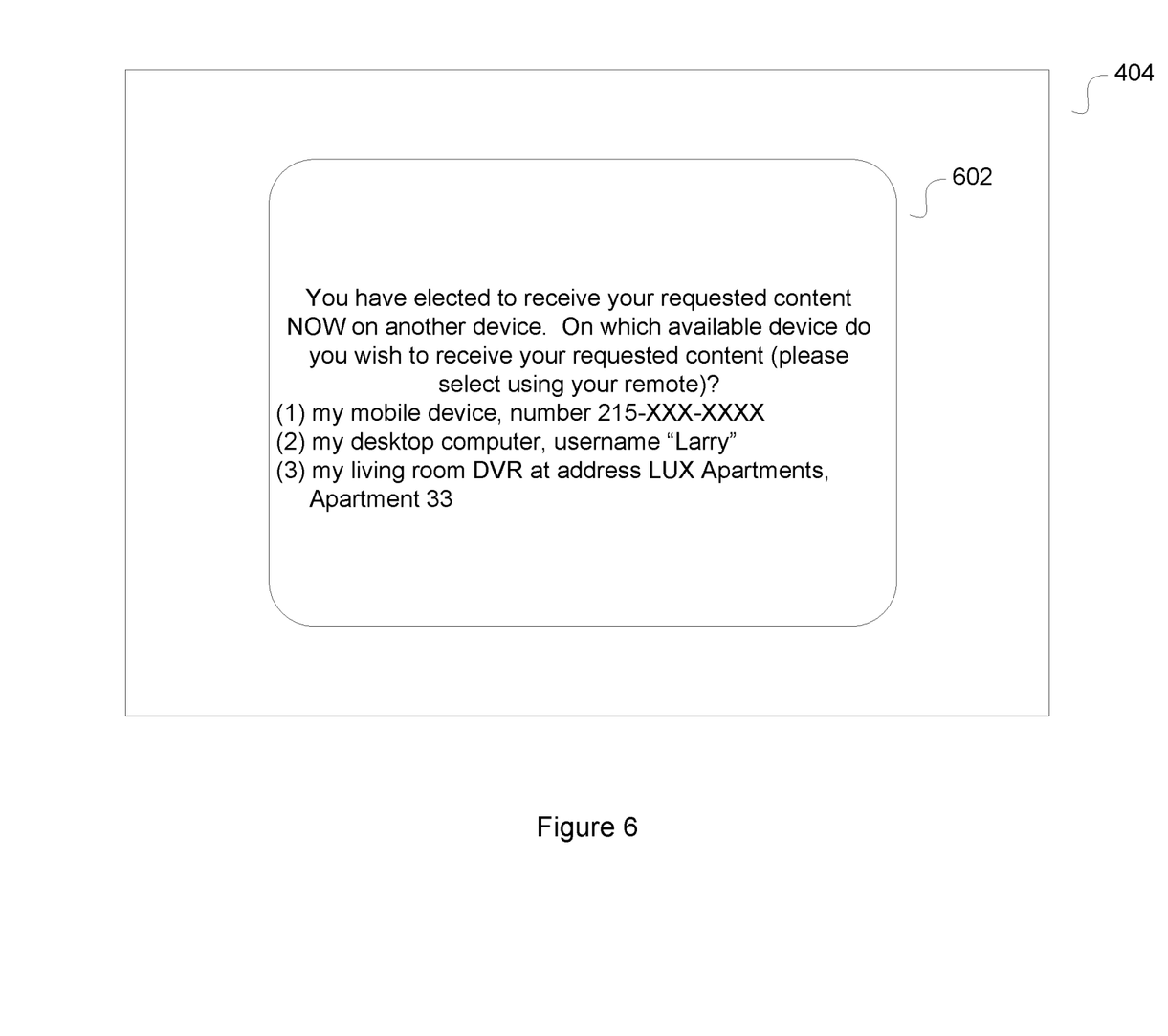
FIG. 6 illustrates an example user interface for prompting a user regarding alternative content delivery in accordance with an aspect of the disclosure.

FIG. 6 shows an exemplary UI 602 presented by a display device 404 of the user device 170 for use in the methodologies of FIGS. 2 and 3, in accordance with an aspect of the disclosure. The illustrated UI may be provided after inquiring as to whether the user would like to receive the requested content or alternate content on an alternate user device (e.g., laptop computer, desktop computer, mobile phone, DVR, etc.), such as a device not currently on a path or network subject to bandwidth constriction. For example, UI 602 may prompt the user the acceptability of delivering the content via an alternate path or alternate network to an alternate user device (e.g., via a wireless network to a mobile phone) rather than via access network 180 to user device 170 (e.g., via a wired data network to a modem). In an example, the UI 602 may list a plurality of plurality of alternate delivery paths for the content and associate a different device with each of the alternate delivery paths.

If the user does wish to view the requested content or alternate content on an alternate user device, the illustrated UI may inquire as to what device is to be used to receive the content. By way of example, if a bandwidth constriction is detected upon receipt of a content request, a hub edge server in receipt of the content request may inquire to, for example, a central facility as to other devices on the account of the requesting user. The central facility may respond with an indication of the other devices to the network server, and either the hub edge server or the central facility may assess which of those other devices of that user is capable of receiving the requested content, or lower bandwidth or larger bandwidth variations of the requested content. The hub edge server may then detect, or may request that a second network server(s) along the alternate path(s) to detect, available bandwidth along the delivery path(s) to those other devices. The hub edge server may, upon receipt of an indication by the user to deliver the requested content to one of the alternate devices, indicate to a second edge server along that alternate device's delivery path that the requested content is to be delivered by that second edge server along that alternate path to that other device.

Figure 7:
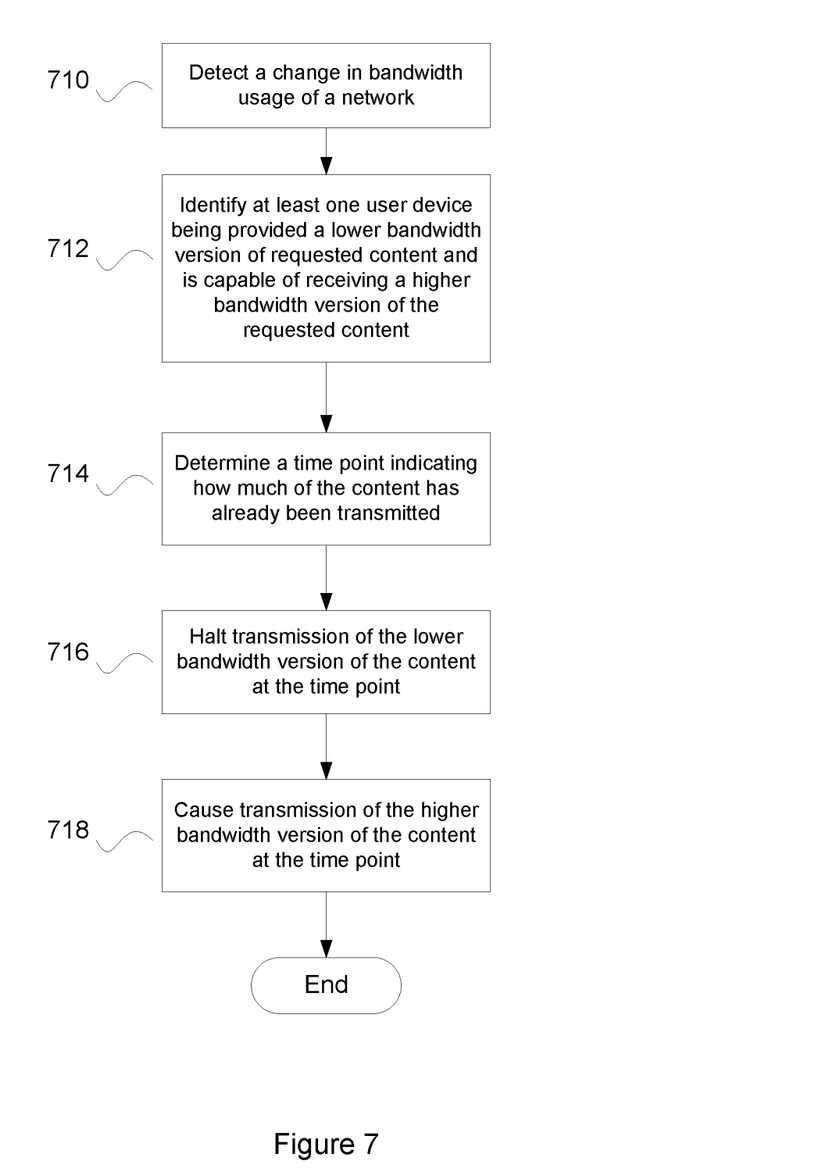
FIG. 7 illustrates an example flow diagram of a method for modifying which version of content is being provided to a customer device in accordance with an aspect of the disclosure.

FIG. 7 illustrates an example flow diagram of a method for modifying which version of content is being provided to a user device in accordance with an aspect of the disclosure. The method may be performed by an edge server, a computer, or other device depicted in FIG. 1. The method may include additional blocks than those depicted in FIG. 7, the blocks may be arranged in other orders, the blocks may repeat one or more times, and the flow diagram may repeat one or more times. The method may begin at block 710.

In block 710, the method may include detecting a change in bandwidth usage of a network. In an example, a hub edge server 160 may receive a message about bandwidth usage and/or may monitor bandwidth usage over at least one of the backbone network 120, the network 130, and the access network 180. If content is remotely stored at the vault server 110, the hub edge server 160 may determine if sufficient bandwidth is available over each of networks 120, 130, and 180 to deliver the higher bandwidth version of the content from the vault server 110 to the user device 170. If the content is cached locally, the hub edge server 160 may determine if sufficient bandwidth is available over the access network 180 to deliver the higher bandwidth version of the content to the requesting user device 170.

As bandwidth becomes available, the hub edge server 160 may attempt to reserve the bandwidth over one or more of the networks 120, 130, and 180 as bandwidth becomes available (e.g., due to termination of a data stream by another user device). The hub server 160 may continue to reserve bandwidth until there is sufficient bandwidth, when combined with the bandwidth being used to transport the lower bandwidth version, to transport the higher bandwidth version. For example, a lower bandwidth version may require 5 megabits per second (Mbps), and the higher bandwidth version may require 10 Mbps. The hub edge server 160 may reserve bandwidth over the access network 180 until 5 Mbps have been reserved.

In another example, the hub edge server 160 may monitor if overall bandwidth usage of one or more of the networks 120, 130, and 180 falls below a certain threshold. When such an event occurs, the hub edge server 160 may attempt to allocate the available bandwidth to user devices being provided lower bandwidth versions of requested content.

In block 712, the method may include identifying at least one user device being provided a lower bandwidth version of requested content and being capable of receiving a higher bandwidth version of the requested content. When bandwidth usages falls below the certain threshold and/or when a certain amount of bandwidth has been reserved, the hub edge server 160 may determine if any of the user devices 170 are receiving a lower bandwidth version of requested content. If multiple user devices are identified, the hub edge server 160 may determine if any are capable of receiving a higher bandwidth version of the content. For example, the hub edge server 160 may store a device profile indicating whether a user device 170 is capable of processing the higher bandwidth version. The hub edge server 160 may also query the user device 170 for this information rather than storing a device profile for each user device 170. The hub edge server 160 may also determine whether a customer associated with the user device 170 has a subscription to receive the higher bandwidth version.

If multiple user devices are capable, then the hub edge server 160 may prioritize which is provided the higher bandwidth version of requested content. For content requested by each user device 170, the hub edge server 160 may determine a remaining amount of time in the content. If less than a certain percentage remains (e.g., 20%), then the hub edge server 160 may continue providing the lower bandwidth version. If greater than the certain percentage remains, the hub edge server 160 may select the user device 170 associated with requested content having a shortest remaining time that still exceeds the certain percentage to upgrade to receive the higher bandwidth version. The hub edge server 160 may select subsequent user devices 170 having a next shortest remaining time that still exceeds the certain percentage for an upgrade, and so forth, until insufficient bandwidth remains.

In bock 714, the method may determine a time point of the content indicating how much of the content already has been transmitted to the user device 170. For example, the hub edge server 160 determine that requested content is an hour long television program, and 35 minutes of the program have already been transmitted to the user device 170.

In block 716, the method may include halting transmission of the lower bandwidth version of the content. For example, the hub edge server 160 may terminate transporting of the lower bandwidth version of the content in a data stream.

In block 718, the method may include causing transmission of the higher bandwidth version of the content in the data stream at the time point. For example, if the higher bandwidth version of the content is not stored locally, the hub edge server 160 may establish a data stream for transporting the higher bandwidth version of the content, beginning at the time point, from the vault server 110 to the user device 170 via the networks 120, 130, and 180. In another example, if the higher bandwidth version of the content is not stored locally, the hub edge server 160 may obtain and locally cache the requested content from the vault server 110, and include the content in the data stream to the user device 170 beginning at the time point. In a further example, if the higher bandwidth version of the content is stored locally, the hub edge server 160 may include the requested content in the data stream beginning at the time point, for transport of the higher bandwidth version of the content to the user device 170.

After providing an upgrade to a first user device, if there is at least one other user device 170 receiving a lower bandwidth version and if excess bandwidth remains, the hub edge server 160 may then attempt to provide a higher bandwidth version to each of the other user devices 170, based on the priority mechanism described above, until there is insufficient excess bandwidth available to provide content requested by a particular user device 170.

If the particular user device 170 is not the last user device in the priority scheme, the hub edge server 160 may then determine if a higher bandwidth version of the requested content can be supplied to any of the user devices, regardless of priority. For instance, each user device 170 may request different content, and each content may require a different amount of bandwidth for delivery. The hub edge device 160 may proceed from user device to user device until either (1) a user device is identified where the remaining available bandwidth is sufficient to provide a higher bandwidth version of requested content; or (2) a last user device is reached and there is insufficient bandwidth to provide the higher bandwidth version of requested content to any of the user devices receiving a lower bandwidth version. If (1) occurs, the hub edge server 160 may provide the higher bandwidth version to that user device, in the manner described above, and continue from user device to user device to determine if subsequently remaining bandwidth can be used to provide the higher bandwidth version of requested content to any of the remaining user devices.

As bandwidth usage may vary over time, the hub edge server 160 may constantly and/or periodically monitor bandwidth usage to determine when bandwidth becomes available to provide higher bandwidth versions of content to user devices 170.

In the description above, the disclosure is described with reference to acts and operations that are performed by one or more computers, unless indicated otherwise. As such, it will be understood that such acts and operations may include computing code that is computer-executed, and thus may include the manipulation by a processing unit of the computer of electrical signals representing data in a structured form. This manipulation transforms the data and/or maintains the data at locations in the memory system of the computer, and the manipulation reconfigures or otherwise alters the operation of the computer in a manner well understood by those skilled in the art. However, while the disclosure is described in the foregoing context, it is not limited, at least in that several of the acts and operations described may also be implemented in hardware.

The disclosure is operational with numerous general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure is described in the general context of computer-executable instructions, such as program modules, that, when executed by a processor, cause a computer to perform certain operations. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including non-transitory memory storage devices, such as a hard disk, random access memory (RAM), and read only memory (ROM).

Although the disclosure is set forth with a certain degree of particularity, it is understood that the disclosure has been made by way of example, and that numerous changes in the details of construction and combination and arrangement of parts and steps may be made without departing from the spirit and scope of the disclosure and of the claims as set forth hereinafter.

The invention claimed is:

1. A system comprising:
 a server comprising:
  one or more first processors; and
  memory storing first instructions that, when executed by the one or more first processors, cause the server to:
   determine, based on determining that there is insufficient bandwidth for transmitting a first version of content via a first network path to a computing device and a second network path to the computing device, a second version of the content capable of being transmitted using a bandwidth lower than an amount of bandwidth associated with the first version of the content;
   determine a predicted time at which there will be sufficient bandwidth for transmitting the first version of the content via the first network path or the second network path;
   transmit, to the computing device, a query for an indication of whether to receive the second version of the content at a first time prior to the predicted time or to receive the first version of the content at the predicted time; and
   based on whether a response to the query indicates to receive the second version of the content at the first time or receive the first version of the content at the predicted time, cause transmission of the second version of the content at the first time or cause transmission of the first version of the content at the predicted time; and
 a computing device comprising:
  one or more second processors; and
  memory storing second instructions that, when executed by the one or more second processors, cause the computing device to:
   receive, from the server, the query for the indication of whether to receive the second version of the content at the first time prior to the predicted time or to receive the first version of the content at the predicted time; and
   transmit, to the server, a response to the query.

2. The system of claim 1, wherein the determining that there is insufficient bandwidth is based on a comparison of the amount of bandwidth associated with the first version of the content to a monitored amount of available bandwidth for the first network path and a monitored amount of available bandwidth for the second network path,
 wherein the determine the predicted time is based on a history of available bandwidth over time for the first network path and the second network path.

3. The system of claim 1, wherein the query is further for an indication of whether to receive the first version of the content at an alternative device.

4. The system of claim 1, wherein the determine the predicted time is based on an average amount of available bandwidth over time for the first network path and an average amount of available bandwidth over time for the second network path.

5. The system of claim 1, wherein the first instructions, when executed by the one or more first processors, cause the server to:
 detect a change in bandwidth usage of the first network path or the second network path; and
 after detecting the change in bandwidth usage of the first network path or the second network path, cause transmission of the second version of the content to be stopped and cause transmission of the first version of the content.

6. The system of claim 5, wherein the first instructions, when executed by the one or more first processors, cause the server to determine that the second version of the content is being transmitted to the computing device and that the computing device is capable of receiving the first version of the content.

7. A non-transitory computer-readable medium storing instructions that, when executed, cause:
 determining, based on determining that there is insufficient bandwidth for transmitting a first version of content via a first network path to a computing device and a second network path to the computing device, a second version of the content capable of being transmitted using a bandwidth lower than an amount of bandwidth associated with the first version of the content;
 determining a predicted time at which there will be sufficient bandwidth for transmitting the first version of the content via the first network path or the second network path;
 transmitting, to the computing device, a query for an indication of whether to receive the second version of the content at a first time prior to the predicted time or to receive the first version of the content at the predicted time; and
 based on whether a response to the query indicates to receive the second version of the content at the first time or receive the first version of the content at the predicted time, causing transmission of the second version of the content at the first time or causing transmission of the first version of the content at the predicted time.

8. The non-transitory computer-readable medium of claim 7, wherein the determining that there is insufficient bandwidth is based on a comparison of the amount of bandwidth associated with the first version of the content to a monitored amount of available bandwidth for the first network path and a monitored amount of available bandwidth for the second network path,
wherein the determining the predicted time is based on a history of available bandwidth over time for the first network path and the second network path.

9. The non-transitory computer-readable medium of claim 7, wherein the query is further for an indication of whether to receive the first version of the content at an alternative device.

10. The non-transitory computer-readable medium of claim 7, wherein the determining the predicted time is based on an average amount of available bandwidth over time for the first network path and an average amount of available bandwidth over time for the second network path.

11. The non-transitory computer-readable medium of claim 7, wherein the instructions, when executed, cause:
detecting a change in bandwidth usage of the first network path or the second network path; and
after detecting the change in bandwidth usage of the first network path or the second network path, causing transmission of the second version of the content to be stopped and causing transmission of the first version of the content.

12. The non-transitory computer-readable medium of claim 11, wherein the instructions, when executed, cause determining that the second version of the content is being transmitted to the computing device and that the computing device is capable of receiving the first version of the content.

13. A system comprising:
a server comprising:
one or more first processors; and
memory storing first instructions that, when executed by the one or more first processors, cause the server to:
after determining that there is insufficient bandwidth for transmitting a first version of content via a network path to a computing device:
determine a predicted time in the future at which there will be sufficient bandwidth for transmitting the first version of the content via the network path;
determine a second version of the content capable of being transmitted, via the network path to the computing device, using a bandwidth lower than an amount of bandwidth associated with the first version of the content; and
transmit, to the computing device, a query for an indication of whether to receive the second version of the content at the computing device or to receive the first version of the content at an alternative device, wherein the query comprises an indication of the predicted time; and
cause transmission of the first version of the content to the alternative device after receiving a response to the query that indicates the alternative device is to receive the first version of the content; and
a computing device comprising:
one or more second processors; and
memory storing second instructions that, when executed by the one or more second processors, cause the computing device to:
receive, from the server, the query for the indication of whether to receive the second version of the content at the computing device or to receive the first version of the content at the alternative device; and
transmit, to the server, the response to the query.

14. The system of claim 13, wherein the first instructions, when executed by the one or more first processors, cause the server to:
detect a change in bandwidth usage of the network path; and
after detecting the change in bandwidth usage of the network path, cause transmission of the first version of the content to the alternative device to be stopped and cause transmission of the first version of the content to the computing device.

15. The system of claim 13, wherein the first instructions, when executed by the one or more first processors, cause the server to:
detect a change in bandwidth usage of the network path; and
after detecting the change in bandwidth usage of the network path, cause transmission of the first version of the content to the alternative device to be stopped.

16. The system of claim 15, wherein the first instructions, when executed by the one or more first processors, cause the server to transmit the first version of the content to the computing device.

17. A non-transitory computer-readable medium storing instructions that, when executed, cause:
after determining that there is insufficient bandwidth for transmitting a first version of content via a network path to a computing device:
determining a predicted time in the future at which there will be sufficient bandwidth for transmitting the first version of the content via the network path;
determining a second version of the content capable of being transmitted, via the network path to the computing device, using a bandwidth lower than an amount of bandwidth associated with the first version of the content; and
transmitting, by a server and to the computing device, a query for an indication of whether to receive the second version of the content at the computing device or to receive the first version of the content at an alternative device, wherein the query comprises an indication of the predicted time; and
causing transmission of the first version of the content to the alternative device after receiving a response to the query that indicates the alternative device is to receive the first version of the content.

18. The non-transitory computer-readable medium of claim 17, wherein the instructions, when executed, cause:
detecting a change in bandwidth usage of the network path; and
after detecting the change in bandwidth usage of the network path, causing transmission of the first version of the content to the alternative device to be stopped and causing transmission of the first version of the content to the computing device.

19. The non-transitory computer-readable medium of claim 17, wherein the instructions, when executed, cause:
detecting a change in bandwidth usage of the network path; and after detecting the change in bandwidth usage of the network path, causing transmission of the first version of the content to the alternative device to be stopped.

20. The non-transitory computer-readable medium of claim 17, wherein the instructions, when executed, cause transmitting the first version of the content to the computing device.

* * * * *

UNITED STATES PATENT AND TRADEMARK OFFICE
CERTIFICATE OF CORRECTION

PATENT NO. : 11,109,077 B2
APPLICATION NO. : 16/686853
DATED : August 31, 2021
INVENTOR(S) : Garg et al.

It is certified that error appears in the above-identified patent and that said Letters Patent is hereby corrected as shown below:

In the Specification

Column 6, Line 46:
Delete "100" and insert --110-- therefor

Column 11, Line 60:
Delete "bock" and insert --block-- therefor

Column 12, Line 36:
Delete "device" and insert --server-- therefor

Signed and Sealed this
Twenty-fifth Day of April, 2023

*Katherine Kelly Vidal*

Katherine Kelly Vidal
*Director of the United States Patent and Trademark Office*